(12) United States Patent
Drieux et al.

(10) Patent No.: US 6,179,028 B1
(45) Date of Patent: Jan. 30, 2001

(54) TIRE HAVING BEADS OF SPECIFIED STRUCTURE

(75) Inventors: Jean-Jacques Drieux, Volvic; Olivier Muhlhoff, Clermont-Ferrand, both of (FR)

(73) Assignee: Compagnie Generale des Etablissements Michelin - Michelin & Cie, Clermont-Ferrand Cedex (FR)

( * ) Notice: Under 35 U.S.C. 154(b), the term of this patent shall be extended for 0 days.

(21) Appl. No.: 09/239,168

(22) Filed: Jan. 28, 1999

Related U.S. Application Data

(63) Continuation-in-part of application No. 08/182,548, filed as application No. PCT/EP95/00426 on Feb. 7, 1995, now Pat. No. 5,971,047.

(30) Foreign Application Priority Data

Feb. 28, 1994 (FR) .................................................. 94 02371

(51) Int. Cl.$^7$ ................. B60C 3/06; B60C 9/02; B60C 15/00; B60C 15/024; B60C 17/06
(52) U.S. Cl. .......................... 152/456; 152/158; 152/520; 152/539; 152/544; 152/547; 152/548; 152/550; 152/552
(58) Field of Search ..................................... 152/552, 553, 152/550, 539, 540–541, 543–545, 547, 158, 520, 456, 375, 378 R, 379.3, 379.4, 381.3, 381.4, 396, DIG. 9, DIG. 10, 409, 410, 548

(56) References Cited

U.S. PATENT DOCUMENTS

| | | |
|---|---|---|
| 903,714 | 11/1908 | Hawley et al. .................. 152/553 X |
| 1,261,754 | 4/1918 | Baker .............................. 152/553 X |
| 1,919,911 | 7/1933 | Shoemaker . |
| 2,868,258 | 1/1959 | Powers . |
| 3,301,303 | 1/1967 | Travers . |
| 4,580,610 | 4/1986 | Jackson . |

FOREIGN PATENT DOCUMENTS

| | | |
|---|---|---|
| 1327810 | 4/1963 | (FR) . |
| 2211354 | 7/1974 | (FR) . |
| 2713557 | 6/1995 | (FR) . |
| 767378 | 1/1957 | (GB) . |
| 71465 | 6/1975 | (LU) . |

*Primary Examiner*—Adrienne C. Johnstone

(57) ABSTRACT

A tire with a radial carcass reinforcement, when viewed in meridian section, includes a first bead, the seat of which is inclined towards the outside, the heel of the bead being axially on the inside and being reinforced by at least a reinforcement ring, the toe of the bead being axially on the outside and having a rubber wedge section made of rubber mix, the wedge being defined by two sides, the said rubber mix having a Shore A hardness greater than the Shore A hardness(es) of the rubber mixes located axially and radially above the bead ring and above the rubber wedge section. The carcass reinforcement is wound around the bead ring, passing from the inside to the outside to form an upturn extending along the radially inner side of the rubber wedge section, then along the side opposite the apex A, and then covering axially and radially, at least in part, the outside of the rubber section above the wedge section, the said upturn having an end located radially above the reinforcement annular ring of the bead and axially between the straight line $P_1$ extending the radially outer side of the wedge section and the straight line $P_2$ perpendicular to the axis of rotation and tangent at N to the said annular ring.

5 Claims, 1 Drawing Sheet

TIRE HAVING BEADS OF SPECIFIED STRUCTURE

This is a continuation-in-part of copending application Ser. No. 08/682,548, filed Jul. 25, 1996 now U.S. Pat. No. 5,971,047, which is a national stage application of PCT/EP95/00426, filed Feb. 7, 1995.

BACKGROUND OF THE INVENTION

The present invention relates to a tire intended to be mounted on a rim having at least a first frustoconical seat, the generatrix of which has an axially outer end closer to the axis of rotation than the axially inner end.

Such a tire is described in international application WO 94/13498. It comprises at least a first bead, intended to be mounted on a first seat inclined towards the outside, the said first bead, having a seat the generatrix of which has its axially outer end closer to the axis of rotation than its axially inner end, and the said generatrix being extended axially towards to the outside by an outer face delimiting the bead toe, the said face forming with the axis of rotation an angle γ, open radially and axially towards the outside and of less than 90°. The radial carcass reinforcement of the said tire, anchored in each bead to at least an inextensible annular bead ring, has a meridian profile, when the tire is mounted on its service rim and inflated to its service pressure, with a constant direction of curvature in the sidewall and bead terminated by the toe and which is such that, in said bead, the tangent to the point of tangency of said profile with the inextensible bead ring forms with the axis of rotation an angle ø open towards the outside of at least 70°.

The bead of such a tire and more particularly the structure of the anchoring of carcass reinforcement may be variable. In the application WO 95/23073, the radial carcass reinforcement is anchored to the inextensible bead wire by winding around the said wire passing from the heel to the toe of the bead to form an upturn extending in a rubber section, made of rubber mix in the form of a wedge defined by two sides coming from an apex A located beneath the meridian section of the coated bead wire, the radially outer side forming, with a line parallel to the axis of rotation passing through said apex A, an acute angle $ø_1$, open radially towards the outside and between 20° and 70°, and the radially inner side forming with said parallel line an acute angle $ø_2$, open radially towards the inside, the rubber mix forming the rubber section axially adjacent to the bead wire having a Shore A hardness greater than the Shore A hardness (es) of the rubber mixes located axially and radially above the wire and the rubber section.

The combination of the carcass reinforcement meridian profile such as described in the first cited application with a structure of hooking such as described in the second cited application makes possible to obtain a very good compromise between the handling properties of the tire inflated to its recommended pressure and the said properties when the tire is inflated to a reduced pressure or even zero. Whether the initial clamping on the rim be zero or of a given value, the axial displacement of the anchoring bead wire of the carcass reinforcement, which may result from the tension of said reinforcement, which tension is due, for instance, to the inflation pressure of the tire, makes possible, in combination with the axial disposition of the rubber section reinforced by the upturn, to obtain clamping of the toe of the bead on the rim seat. The value of this clamping increases as a function of the tension force to which the carcass reinforcement is subjected, and may become great in the case of high tension, for instance when one of the side walls of the tire is placed under great tension by a transverse force.

The preferential solution described in the application WO 95/23073 is such that the carcass reinforcement upturn has a length such that it is in contact with the total perimeter of the rubber section or wedge; it thus forms the two radially outer and inner sides of the rubber section and the side opposite the apex or center of said rubber section, and its end is located axially beyond the point of intersection of the two outer and inner sides. The part of the upturn immediately adjacent to the part of said upturn which is wound around the bead wire may, in the first instance, form the radially outer edge of the rubber section or wedge and then finally the radially inner side of said rubber section, ending beyond the junction point of the two outer and inner sides. It may also form firstly the radially inner side of the rubber section or wedge, then the side opposite the apex of said wedge, and then finally the radially outer side of said rubber section, ending in the same manner as previously described.

The above two structures are complicated and difficult to use industrially, and as a consequence, expensive. Furthermore, in severe conditions of load, the contact pressure exerted by the bead toe upon the axially outer hump of the rim and the great temperature that may be reached in the said bead are such that fissures of rubber may occur in the external protecting layer of the bead, fissures which are propagated along the upturn of the carcass reinforcement and reach the radially inner face of the anchoring bead wire with destruction of the bead.

The invention has for object to remedy these drawbacks while keeping the excellent properties of unseating of tire beads.

SUMMARY OF THE INVENTION

According to the invention, a tire with a radial carcass reinforcement, when viewed in meridian section, comprises at least a first bead, the seat of which has a generatrix the axially inner end of which is on a circle of a diameter greater than the diameter of a circle on which is the axially outer end, the heel of the bead being axially on the inside and being reinforced by at least a reinforcement ring, annular, inextensible and coated with a rubber mix, the toe of bead being axially on the outside and comprising a rubber section made of rubber mix in the form of a wedge delimited by two sides coming from an apex A located beneath the meridian section of the coated bead ring, the radially outer side forming, with a line parallel to the axis of rotation passing through said apex A, an acute angle $ø_1$, open radially and axially towards the outside, and the radially inner side forming with said parallel line an acute angle $ø_2$, open radially towards the inside, the rubber mix forming the rubber section axially adjacent to the bead ring, having a Shore A hardness greater than the Shore A hardness(es) of the rubber mixes located axially and radially above the bead ring and above the rubber section, is characterized in that the carcass reinforcement of the said tire is wound, at least in the first bead, around the bead ring passing from the inside to the outside to form an upturn extending along the radially inner side of the rubber section in form of a wedge, then along the side opposite the apex A, and then covers axially and radially on the outside, at least in part, the rubber section radially above the rubber section or wedge, the said upturn having an end located radially above the reinforcement annular ring of bead and axially between the straight line, extending the radially outer side of the wedge, and the straight line perpendicular to the axis of rotation and tangent at N to the said annular ring.

Preferably, the tire comprises a second bead, the seat of which has the same configuration as the seat of the first bead, i.e a seat the generatrix of which has an axially inner end on a circle of diameter greater than the diameter of the circle on which is the axially outer end or seat inclined towards the outside.

If the diameter of a seat is the diameter of the circle on which is the end of its generatrix farthest from the axis of rotation, the tire has preferably two seats inclined towards the outside and the two seats have unequal diameters.

The meridian profile of the carcass reinforcement, when the tire is mounted on its service rim and inflated to its service pressure, has a constant direction of curvature, at least in the first bead and the sidewall which extends it, and the tangent TT' to the point of tangency T of said profile with the reinforcement of the said bead forms with the axis of rotation an angle ø open towards the outside at least equal to 70°.

DESCRIPTION OF THE DRAWING

The invention will be better understood with reference to the drawing appended as FIG. 1 which illustrates a non-limiting example of an embodiment of a tire according to the invention, and which, when associated with a suitable rim, forms a high-performance tire-rim assembly. In this drawing, the FIGURE shows a diagram of a tire bead according to the invention and mounted on the seat of its mounting rim.

DESCRIPTION OF THE PREFERRED EMBODIMENT

Figure 1:
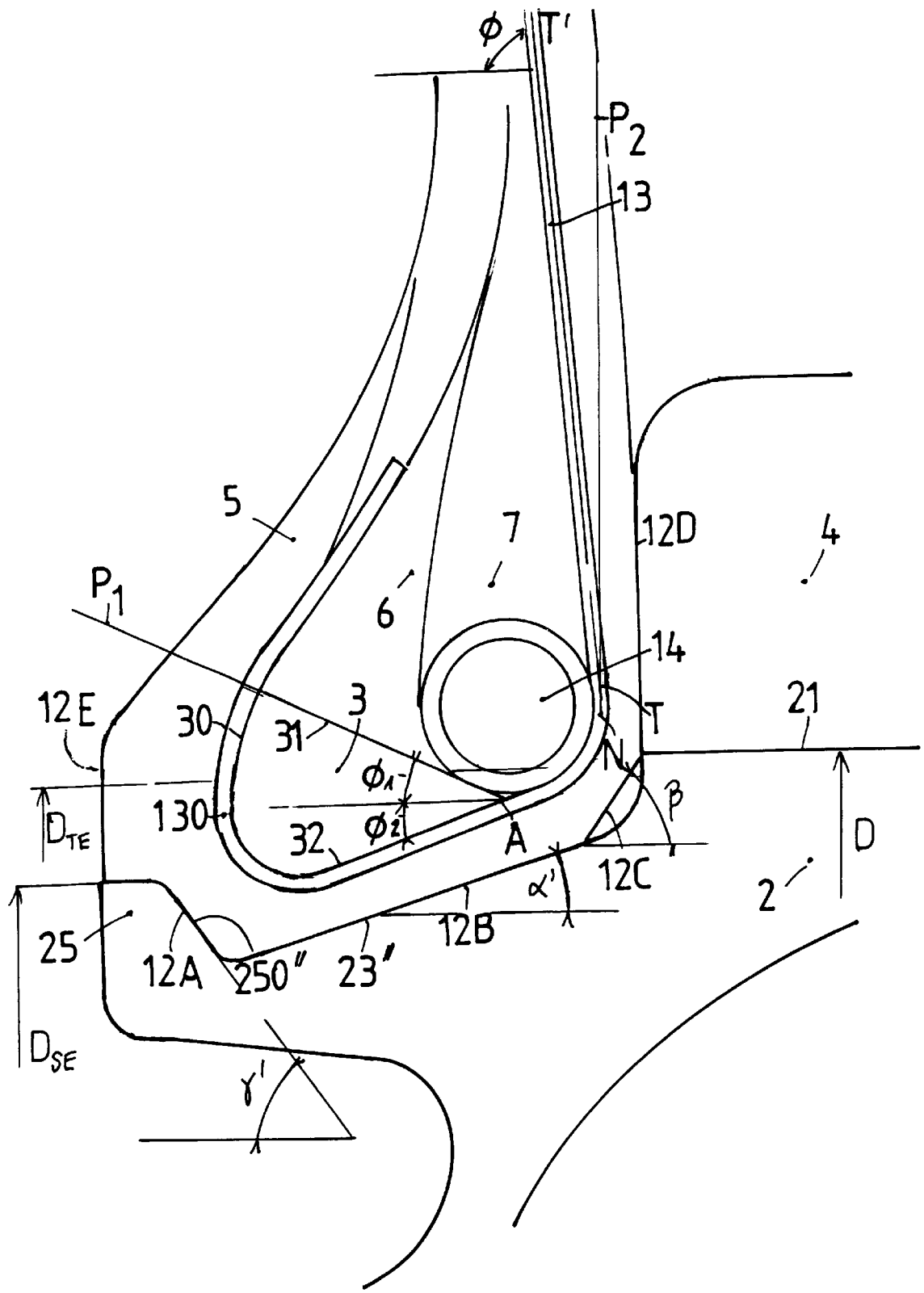

The rim 2, on which the tire 1 is mounted, is formed mainly by two frustoconical rim seats the generatrices of which form with the axis of rotation an angle α', open towards the outside of the tire, of between 4° and 30°, and in the shown example equal to 14°, which is less than the angle of corresponding generatrices of the bead seats of the tire. The said seats have axially outer ends on circles, the diameters of which are smaller than the diameters of the circles on which the axially inner ends are located. The seat 23", mounted for instance towards the outside of the vehicle, is axially extended on the outside by a projection or hump 25", the inner face 250" of which forms with the axis of rotation an angle γ', the diameter $D_{SE}$ of which is less than the inner diameter $D_{TE}$ of the bead wire 14 reinforcing the bead intended to be mounted on the said seat, and the height $h_1$ of which, measured with respect to the axially outer of the rim seat 23", is a height comparable with the height of humps or projections utilized axially on the inside of conventional rims for passenger cars. On the outside of the vehicle, the rim seat 23" is connected to a cylindrical bearing surface 21 on which a bearing support will rest. The diameter of the cylindrical portion 21 is the nominal diameter of the rim.

The contour of the bead, mounted on the seat 23", comprises, axially on the inside a wall 12D substantially perpendicular to the axis of rotation and bearing laterally on the axially outer face of the bearing support. The said wall 12D is extended axially on the outside by a frustoconical generatrix 12C forming with the axis of rotation an angle β of 45° which is open axially towards the inside and radially towards the outside. Said generatrix 12C is itself extended axially on the outside by a second frustoconical generatrix 12B of the bead seat, which forms with the direction of the axis of rotation an angle α' of 15°, open axially towards the inside and radially towards the outside. Said generatrix is said to be inclined towards the outside, its axially outer end being on a circle of diameter less than the diameter of the circle on which its axially inner end is located. A frustoconical generatrix 12A, extending the generatrix 12B axially on the outside and forming an angle γ less than 90°, in the example equal to 45°, open axially and radially towards the outside, completes the contour of the base of the bead 12. The wall 12E, which is curved in the example described and is of substantially perpendicular general orientation to the direction of the axis of rotation of the rim, completes the contour of the bead.

Whereas the generatrix 12B will bear on the rim seat 23", inclined towards the outside, the generatrix 12A will bear on the axially inner wall 250" of the hump 25 of the rim 2, inclined by the angle γ' equal to the angle γ of the generatrix 12A. The portion of bead adjacent the wall 12D and to the generatrix 12C forms, when viewed in meridian section, the heel of the bead. The portion of the bead adjacent the generatrix 12B, the generatrix 12A, and partially the wall 12E forms the toe of the bead. The heel of bead is reinforced by the anchoring ring 14 of the carcass reinforcement 13, the ring being coated with a rubber mix having a high Shore A hardness. The toe of the bead comprises a rubber section 3, arranged axially on the outside of the anchoring bead ring 14. This rubber section 3 is in the form of a substantially circular sector with an apex or center A located radially below the bead ring, with two sides or radii 31 and 32 starting from said apex, and a third side 30 opposite the apex A. The side or radius 31 radially on the outside forms an angle $ø_1$ of 45° with a line parallel to the axis of rotation and it is open radially and axially towards to the outside, whereas the radially inner side or radius 32 forms an angle $ø_2$ of 15° with the same parallel line and is open radially towards to the inside and axially towards the outside. This rubber section is made of a rubber mix having a Shore A hardness of 94 in the vulcanized state.

The coated bead ring 14 is surmounted radially on the outside by a rubber section 7 of rubber mix having a Shore A hardness of 37. Radially on the outside of the rubber section 3 and axially on the outside of said rubber section 7, there is located a third rubber section 6 made of rubber mix having a Shore A hardness equal to that of the rubber section 7 and therefor significantly less than the hardness of the mix of the rubber section 3, which makes it possible, upon an increase of tension of the carcass reinforcement, to facilitate the axial displacement of the ring 14 towards the outside of the bead and thus create a compression of the rubber section 3 and a self-clamping of the toe of the bead on the mounting rim 2, whereas, in the described example, the initial clamping of the bead on said rim is practically zero, owing to the quasi-equality between the angles of the rim and bead seats.

The carcass reinforcement 13 has a meridian profile, when the tire is mounted on its service rim 2 and inflated to its service pressure, which has a direction of curvature constant on its entire length, and is such that tangents TT' to points of tangency T of said profile with the coated bead rings form with the axis of rotation angles ø open radially and axially towards the outside and at least equal to 70° and preferably equal to 80°. The said carcass reinforcement 13 is wound around the coated bead ring passing from the heel to the toe of the bead, or from the inside to the outside, to form an upturn 130 extending along the radially inner side 32 of the rubber section 3 in the form of a wedge, then along the side 30 opposite the apex A, and then covering axially and radially on the outside, at least in part, the rubber section 6 radially above the rubber section or wedge 3. The end of the said upturn is located radially above the reinforcement annular ring 14 of the bead and axially between two straight lines, the line $P_1$ defining an extension of the radially outer side 31 of the wedge 3, and the straight line $P_2$ perpendicular to the axis of rotation and tangent at the point N to the said annular ring 14. The so structured carcass reinforcement upturn 130 has a sufficient length to have a good resistance to the unwinding of carcass reinforcement, while allowing a lesser propagation rate of fissures occurring in the external protecting layer 5 of bead, and to avoid the propagation towards the annular bead ring 14.

We claim:

1. A tire, viewed in meridian section, having a radial carcass reinforcement and a first bead, the seat of which has a generatrix the axially inner end of which is on a circle of a diameter greater than the diameter of a circle on which is the axially outer end, the bead having a heel axially on the inside and reinforced by a reinforcement ring, annular, inextensible and coated with a rubber mix, and a toe axially on the outside, the tire further comprising a section made of rubber mix in the form of a wedge delimited by two sides having an apex A located beneath the meridian section of the coated bead ring, the radially outer side forming with a line parallel to the axis of rotation passing through said apex A an acute angle $\phi_1$, open radially and axially towards the outside, and the radially inner side forming with said parallel line an acute angle $\phi_2$, open radially towards the inside, the rubber mix forming the rubber section axially adjacent to the bead ring having a Shore A hardness greater than the Shore A hardness of rubber mixes located axially and radially above the bead ring and above the rubber section, characterized in that the carcass reinforcement of the said tire is wound around the bead ring passing from the inside to the outside to form an upturn extending along the radially inner side of the rubber section in the form of a wedge, then along the side opposite the apex A, and then covering axially and radially on the outside, at least in part, the rubber section radially above the rubber wedge section, the said upturn having an end located radially above the reinforcement annular ring of the bead and axially between a straight line $P_1$, extending the radially outer side of the wedge and a straight line $P_2$ perpendicular to the axis of rotation and tangent at N to the said annular ring.

2. A tire according to the claim 1, comprising a second bead, the seat of which has the same configuration as the seat of the first bead, the generatrix of which has an axially inner end on a circle of diameter greater than the diameter of the circle on which the axially outer end is located.

3. A tire according the claim 2, in which the two seats are inclined towards the outside are of different diameters.

4. A tire according the claim 3, in which the generatrices of bead seats are axially on the outside extended by frusto-conical generatrices forming with the direction of the axis of rotation an angle $\gamma$, open axially and radially towards the outside and less than 90°.

5. A tire according the claim 4, in which the meridian profile of the carcass reinforcement, when the tire is mounted on its service rim and inflated to its service pressure, has a constant direction of curvature, at least in the first bead and the sidewall which extends it, the tangent TT' to the point of tangency T of said profile with the reinforcement bead ring of the said bead forming with the axis of rotation an angle $\phi$ open towards the outside at least equal to 70°.

* * * * *

UNITED STATES PATENT AND TRADEMARK OFFICE
CERTIFICATE OF CORRECTION

PATENT NO. : 6,179,028 B1  
DATED : January 30, 2001  
INVENTOR(S) : Drieux et al.

Page 1 of 1

It is certified that error appears in the above-identified patent and that said Letters Patent is hereby corrected as shown below:

<u>Title page,</u>  
Item [63], Related U.S. Application Data, "08/182,548" should read -- 08/682,548 --

<u>Column 4,</u>  
Line 5, "$\gamma$" should read -- $\gamma'$ --

<u>Column 6,</u>  
Line 16, "are" should read -- and are --  
Line 20, "$\gamma$" should read -- $\gamma'$ --

Signed and Sealed this

Seventh Day of May, 2002

Attest:

JAMES E. ROGAN  
*Director of the United States Patent and Trademark Office*

*Attesting Officer*